United States Patent
Marshall (10) Patent No.: US 11,150,121 B2
(45) Date of Patent: Oct. 19, 2021

(54) MONITORING OF FLUID FLOW

(71) Applicant: Coventry University, Coventry (GB)

(72) Inventor: Craig Marshall, Coventry (GB)

(73) Assignee: COVENTRY UNIVERSITY, Coventry (GB)

(*) Notice: Subject to any disclaimer, the term of this patent is extended or adjusted under 35 U.S.C. 154(b) by 89 days.

(21) Appl. No.: 16/347,394

(22) PCT Filed: Oct. 30, 2017

(86) PCT No.: PCT/GB2017/053256
§ 371 (c)(1),
(2) Date: May 3, 2019

(87) PCT Pub. No.: WO2018/083453
PCT Pub. Date: May 11, 2018

(65) Prior Publication Data
US 2019/0310122 A1 Oct. 10, 2019

(30) Foreign Application Priority Data

Nov. 4, 2016 (GB) .................................. 1618600.9

(51) Int. Cl.
G01F 15/02 (2006.01)
G01F 1/34 (2006.01)
G01F 25/00 (2006.01)

(52) U.S. Cl.
CPC ................ *G01F 15/02* (2013.01); *G01F 1/34* (2013.01); *G01F 25/0007* (2013.01)

(58) Field of Classification Search
CPC .......... G01F 15/02; G01F 25/007; G01F 1/34; G01F 1/44; G01F 1/88
See application file for complete search history.

(56) References Cited

U.S. PATENT DOCUMENTS

| | | | |
|---|---|---|---|
| 8,136,414 B2 | 3/2012 | Steven | |
| 2008/0264182 A1 | 10/2008 | Jones et al. | |
| 2010/0191481 A1* | 7/2010 | Steven | G01F 1/88 |
| | | | 702/47 |

FOREIGN PATENT DOCUMENTS

| | | |
|---|---|---|
| GB | 2504000 | 1/2014 |
| WO | 99/36748 | 7/1999 |

OTHER PUBLICATIONS

Steven, Richard, "Diganostic System for Venturi Meters", Jan. 1, 2011, 15th International Flow Measurement Conference 2010, vol. 2, p. 955.*

(Continued)

*Primary Examiner* — Manuel L Barbee
(74) *Attorney, Agent, or Firm* — Burns & Levinson LLP; Bruce Jobse; Daniel McGrath (57) ABSTRACT

The present invention provides a method and apparatus for the measurement of a pressure differential across a differential pressure flow meter $\Delta P_1$ and the line pressure drop due to friction $\Delta P_f$ along a length L of pipe. Subsequently, the quantity (formula) is calculated, enabling the inline calculation of multiple properties of the flow. Calculated flow properties include friction factor, Reynolds number, discharge coefficient, density, viscosity, and corrected flowrate. The present invention further relates to a method of calibration of a differential flow meter and a calibration apparatus for a differential flow meter utilising the same principles.

32 Claims, 4 Drawing Sheets

(56) References Cited

OTHER PUBLICATIONS

Richard Steven; "Diagnostic System for Venturi Meters"; 15th International Flow Measurement Conference 2010; vol. 2; Jan. 1, 2011; 20 pages.
Great Britain Search Report for GB Patent Application No. GB1618600.9; dated Apr. 10, 2017; 4 pages.
International Search Report and Written Opinion for PCT Application No. PCT/GB2017/053256, dated Mar. 22, 2018, 19 pages.

\* cited by examiner

MONITORING OF FLUID FLOW

CROSS-REFERENCE TO RELATED APPLICATIONS

This application is the U.S. national phase entry under 35 U.S.C. § 371 of International Application No. PCT/GB2017/053256, filed Oct. 30, 2017, entitled IMPROVEMENTS IN OR RELATING TO THE MONITORING OF FLUID FLOW, which in turn claims priority to and benefit of Great Britain Application No. 1618600.9, filed Nov. 4, 2016; each of which is incorporated herein by reference in their entirety for all purposes.

TECHNICAL FIELD OF THE INVENTION

The present invention relates to monitoring fluid flow. In particular, the present invention relates to monitoring of fluid flow at, but not limited to, low Reynolds numbers using differential pressure flow meters.

BACKGROUND TO THE INVENTION

The flow measurement of fluids is vitally important to the world economy. Not only through having accurate values for the quantities of goods bought or sold, but for the safe and continued operation of processes across all industries. Without accurate measurement control, optimisation, trade and most importantly safe operation could not be achieved. Accurate flow measurement is achieved through the use of repeatable flow meters which are applied following industry best practice.

A particularly well known type of flow meter technology is called a differential pressure flow meter which is based around the use of primary element within a pipe. The primary element can have many different geometries but typically consists of an obstruction or an expansion in the pipe that causes a variation in the static pressure of the system. By measuring the differential pressure between immediately upstream of the primary element and at a point where the pressure has changed due to the primary element, the volumetric or mass flow rate can be determined. The mechanism that relates the differential pressure to the volumetric or mass flow rate can be derived from Bernoulli's theorem which is based on the conservation of energy within a flowing fluid. Bernoulli's theorem uses the assumption of an inviscid flow. However, in practice this assumption is invalid and a correction factor called a discharge coefficient is used to correct practical measurements to theory.

As stated, there are many types of primary element with the most common being orifice plates, Venturis, cone and wedges. Nevertheless, any installation that causes a repeatable, reproducible and measurable pressure differential can be considered a primary element e.g. Coriolis meter, turbine meter, reduced bore ultrasonic meter, valves, process equipment, etc. Whichever primary element is used in a differential pressure meter, the fundamental operation and equations are the same and differ only in the geometries and respective geometric parameter calculation i.e. beta. For all differential pressure flow meter types, the density of the fluid being measured is also required to complete the calculation of mass or volumetric flow rate.

Differential pressure flow meters are widely used in industry as they provide accurate measurements, linear discharge coefficients, are robust and have prescriptive standards, are easy to maintain and have a theory of operation that is straightforward to understand. These advantages have been instrumental to differential pressure flow meters attaining a large and continued market share of world flow meter sales. However, these advantages only apply in high Reynolds number applications with some standards stating a lower limit of applicability of 200,000 Reynolds number (ISO 5167:2003-4 Venturis). Fluid flows above a Reynolds number of 200,000 are typical of gases, water and other liquids with a low viscosity.

At lower Reynolds numbers, the linearity of the discharge coefficient deteriorates significantly, the accuracy is critically dependent on knowing the operating Reynolds number and most written standards do not apply. This effect is compounded the lower the Reynolds number is with even very small changes in Reynolds number causing large mis-measurement issues. In addition to the above, the fluid flow mechanism changes at very low Reynolds numbers (below 10,000 depending on fluid) and the flow regime can turn from turbulent flow, to transitional through to laminar flow. Each flow mechanism has its own effect on the measurement performance of differential pressure flow meters. It should be stated that all flow meters will have a Reynolds number affect to varying degrees. Fluid flows below a Reynolds number of 20,000 are typical of higher viscosity fluids.

Differential pressure flow meters have been shown to be repeatable and reproducible in turbulent, transition and laminar flows. The issue lies in the fact that the operating Reynolds number is unknown in practice and without this it is impossible to correct the flow meters performance. Determining the operating Reynolds number requires additional measurements of physical properties adding to cost and complexity. Even so, it may still be difficult to determine the Reynolds number with sufficient accuracy to make reliable calculations of the flow rate.

It is therefore an object of the present invention to address problems with the prior art.

SUMMARY OF THE INVENTION

According to a first aspect of the present invention there is provided a method of monitoring fluid flow, the method comprising the steps of: measuring a pressure differential across a differential pressure flow meter $\Delta P_1$; measuring the line pressure drop due to friction $\Delta P_f$ along a length of pipe L; and calculating the quantity $$\frac{\Delta P_f}{\Delta P_1},$$

and thereby calculating one or more properties of the flow.

The present method thus facilitates the calculation of various properties of the flow from the quantity $$\frac{\Delta P_f}{\Delta P_1}$$

independent of the specific physical properties of the fluid. Calculating flow properties in line can enable the use of differential pressure flow meters for low Reynolds number flows.

The method is preferably applied in laminar flow conditions or in the low Reynolds number region of turbulent flow. In this context the low Reynolds number region of turbulent flow is below Reynolds number values where the flow is not considered fully turbulent. Nevertheless, some aspects of the method will work in larger Reynolds number regions.

The method may be used with any suitable form of differential pressure flow meter. Suitable forms of differential pressure flow meter include but are not limited to: orifice plates, Venturi meters, Dall tubes, Pitot tubes, multi-hole pressure probes, cone meters, wedge meters, Coriolis meters, turbine meters, reduced bore ultrasonic meter, valves, process equipment and the like. In further embodiments, the differential flow meter may comprise any other form of obstruction or expansion or overall pressure loss that provides a repeatable, reproducible and measurable pressure differential.

The line pressure drop $\Delta P_f$ may be measured along any length of like dimensioned pipe in direct series with the differential pressure flow meter. In one embodiment, the line pressure drop $\Delta P_f$ is measured along a length of pipe directly upstream of the differential pressure flow meter.

The method may be used to calculate the Darcy-Weisbach friction factor, $\lambda$, from the product of the quantity $$\frac{\Delta P_f}{\Delta P_1}$$

and a constant related to meter geometry $C_M$. In such embodiments, the constant $C_M$ may be calculated from $$C_M = \frac{D(1-\beta^4)}{C_d^2 L \beta^4}$$

Where D is the pipe diameter, $\beta$ is a constant related to the structure of the meter and $C_d$ is the discharge coefficient. In the case of orifice plates and Venturi meters, $\beta$ is the ratio of the internal throat diameter d to the pipe diameter D. In the case of other forms of differential pressure flow meters, $\beta$ has other well known definitions. In the case where other suitable obstructions or expansions are used as differential flow meters, an effective $\beta$ can be calculated.

The method may include the steps of calculating the discharge coefficient of the flow. The calculation of the discharge coefficient of the flow meter may be achieved by knowledge of the relationship between discharge coefficient and friction factor or by knowledge of the relationship between discharge coefficient and Reynolds number. The discharge coefficient of the flow may be calculated from the calculated Darcy-Weisbach friction factor $\lambda$ as:

$$C_d = f(\lambda)$$

The discharge coefficient of the flow may be calculated from the calculated Reynolds number Re as:

$$C_d = f(Re)$$

Knowledge of the relationship between discharge coefficient and friction factor, and discharge coefficient and Reynolds number, can be obtained from a calibration of the measurement system or by other means.

The method may include the steps of calculating the discharge coefficient and friction factor by means of iteration using the relationship between discharge coefficient and friction factor and the relationship between friction factor and the quantity $$\frac{\Delta P_f}{\Delta P_1}.$$

In some embodiments, the method may include the step of determining an operational corrected value, $\lambda_{cor}$, of the calculated Darcy-Weisbach friction factor $\lambda$. This enables compensation for variations in pipe conditions. The corrected value $\lambda_{cor}$ may be related to the calculated value $\lambda$ by:

$$\lambda_{cor} = \frac{\lambda_{the}}{\lambda_{calib}} \lambda$$

Where $\lambda_{calib}$ is the friction factor value measured during calibration of the differential pressure flow meter and $\lambda_{the}$ is the theoretical value of the Darcy-Weisbach friction factor. In ideal conditions $\lambda_{cor}$ should equal $\lambda_{the}$.

The method may include the further step of calculation of the flow rate. The calculation may be achieved using the equation:

$$Q = C_d \varepsilon \frac{\frac{\pi d^2}{4}}{\sqrt{(1-\beta^4)}} \sqrt{\frac{2(\Delta P_1)}{\rho}}$$

Where Q is the volumetric flowrate, $\varepsilon$ is the expansibility of the fluid (equal to 1 for incompressible fluids) and $\rho$ is the density. In such embodiments, the density may be determined by standard methods including but not limited to sampling of the fluid and off-line laboratory analysis.

The method may include the additional step of calculating the Reynolds number of the flow. The Reynolds number of the flow may be calculated from the calculated Darcy-Weisbach friction factor $\lambda$ or from the operational corrected value, $\lambda_{cor}$, of the calculated Darcy-Weisbach friction factor. The calculation of the Reynolds number of the flow may be achieved by using well known correlations of friction factor and Reynolds number such as $$\lambda = \frac{64}{Re}$$

in laminar flow or the Colebrook-White equation (or similar correlations) for turbulent flows.

In some embodiments, the method may include the step of calculating an operational corrected value, $Re_{cor}$, of the calculated Reynolds number Re. This enables compensation for variations in pipe conditions. The corrected value $Re_{cor}$ may be related to the calculated value Re by:

$$Re_{cor} = \frac{Re_{ref}}{Re_{calib}} Re$$

Where $Re_{calib}$ is the Reynolds number value measured during calibration of the differential pressure flow meter and $Re_{ref}$ is the reference value of the Reynolds number.

In some embodiments, the method may include the steps of calculating the discharge coefficient from the Reynolds number, where the Reynolds number is determined from the calculated Darcy-Weisbach friction factor $\lambda$. This may be achieved by means of iteration using the relationship between the discharge coefficient and the Reynolds number, the relationship between the Reynolds number and the Darcy-Weisbach friction factor λ and the relationship between Darcy-Weisbach friction factor λ and the quantity $$\frac{\Delta P_f}{\Delta P_1}.$$

The method may include the steps of calculating the density, ρ, of the flow. The density ρ may be calculated from the calculated Darcy-Weisbach friction factor λ or from the operational corrected value, $\lambda_{cor}$, of the calculated Darcy-Weisbach friction factor. The calculation of the density ρ may be achieved using knowledge of the velocity, u, in the pipe where the measurement of $\Delta P_f$ is taken. In such cases, the method may involve the additional step of determining the velocity of the fluid in the pipe. The velocity may be measured within the length L along which the line pressure drop due to friction $\Delta P_f$ is measured. The velocity may be measured at a location outside the length L with the velocity within L being determined therefrom. Preferably, the velocity measurement is taken at a sufficient separation from the differential pressure flow meter such that the variation in velocity due to the flow restriction of the primary element does not impact on measurement. In some embodiments, the velocity measurement may be acquired from the primary element. This may be the case where an intrusive flow meter is used. Examples of intrusive flow meters include but are not limited to Coriolis meters or turbine meters.

In such embodiments, the density may be calculated from the measured velocity. In particular, the density may be calculated from the calculated Darcy-Weisbach friction factor λ or from the operational corrected value, $\lambda_{cor}$, of the calculated Darcy-Weisbach friction factor and the measured velocity.

In such embodiments, the density, ρ, of the flow may be calculated using:

$$\rho = \frac{2\Delta P_f D}{\lambda L u^2}$$

In such embodiments, preferably the density, ρ, of the flow is calculated using:

$$\rho = \frac{2\Delta P_f D}{\lambda_{cor} L u^2}$$

The method may involve an iteration of the density equation above and the differential pressure meter flow equation to calculate the density in place of velocity measurement. Given a target value (e.g. from a calibration), it is possible to attain optimal values for both the density and corrected flow based on these equation and the measurements of $\Delta P_1$, $\Delta P_f$ and gained knowledge of Darcy-Weisbach friction factor λ and discharge coefficient $C_d$.

In some embodiments, the method may include the step of determining an operational corrected value, $\rho_{cor}$, of the calculated flow density ρ. The corrected value $\rho_{cor}$ may be related to the calculated value ρ by:

$$\rho_{cor} = \frac{\rho_{ref}}{\rho_{calib}} \rho$$

Where $\rho_{calib}$ is the density value measured during calibration of the differential pressure flow meter and $\rho_{ref}$ is the reference value of the density of the fluid during calibration conditions.

The method may include the steps of calculating the viscosity, μ, of the fluid. The viscosity μ may be calculated from the calculated density ρ or from the operational corrected value, $\rho_{cor}$, of the calculated density.

In such embodiments, the viscosity, μ, of the flow may be calculated using:

$$\mu = \frac{\rho D u}{Re}$$

In such embodiments, preferably the viscosity, μ, of the flow is calculated using:

$$\mu = \frac{\rho_{corr} D u}{Re}$$

In some embodiments, the method may be used to calibrate a differential pressure flow meter. In such embodiments, the method may incorporate the additional step of installing the differential pressure flow meter in a test pipe. Subsequently, the method may include measuring across the full Reynolds number range required $\Delta P_1$ and $\Delta P_f$. In such embodiments, the method may involve the further step of calculating across the full Reynolds number range required the quantity $$\frac{\Delta P_f}{\Delta P_1}$$

and thereby calculating calibration coefficients for the use of the differential pressure flow meter. The calibration coefficients calculated may vary with variation in the Reynolds number of the flow. The calibration coefficients calculated may include any one or more of: the Darcy-Weisbach friction factor $$\frac{\lambda_{ref}}{\lambda_{calib}},$$

the discharge coefficient or density $$\frac{\rho_{ref}}{\rho_{calib}}.$$

According to a second aspect of the present invention there is provided a method of calibration of an differential pressure flow meter for monitoring fluid flow comprising the steps of: installing the differential pressure flow meter in a test pipe; measuring across the full Reynolds number range required: a pressure differential across the differential pressure flow meter $\Delta P_1$; and the line pressure drop due to friction $\Delta P_f$ along a length L of pipe; calculating across the full Reynolds number range required the quantity $$\frac{\Delta P_f}{\Delta P_1};$$

and thereby calculating calibration coefficients for the use of the differential pressure flow meter.

The method of the second aspect of the present invention may incorporate any or all features of the first aspect of the present invention as required or as desired.

The method of calibration may include the further steps of: installing the differential pressure flow meter in an operation setting; measuring in operation a pressure differential across a differential pressure flow meter $\Delta P_1$; and the line pressure drop due to friction $\Delta P_f$ along a length L of pipe; calculating the quantity $$\frac{\Delta P_f}{\Delta P_1};$$

and thereby calculating live values of correction parameters.

According to a third aspect of the present invention there is provided an apparatus for monitoring fluid flow, the apparatus comprising: a differential pressure flow meter; pressure sensing elements operable to measure a pressure differential across a differential pressure flow meter $\Delta P_1$; pressure sensing elements operable to measure the line pressure drop due to friction $\Delta P_f$ along a length L of pipe; and a flow property processing unit operable to calculate the quantity $$\frac{\Delta P_f}{\Delta P_1}$$

and to thereby calculate one or more flow properties.

The apparatus of the third aspect of the present invention may incorporate any or all features of the first or second aspects of the present invention as required or as desired.

The pressure sensing elements may comprise of differential pressure transmitters, static pressure transmitters, manometers or any device fit for purpose to measure or calculate differential pressure to sufficient accuracy.

The differential pressure flow meter may comprise any of: orifice plates, Venturi meters, Dall tubes, Pitot tubes, multi-hole pressure probes, cone meters, wedge meters, Coriolis meters, turbine meters, reduced bore ultrasonic meter, valves, process equipment and the like. In further embodiments, the differential flow meter may comprise any other form of obstruction or expansion or overall pressure loss that provides a repeatable, reproducible and measurable pressure differential.

The line pressure drop $\Delta P_f$ may be measured along any length of like dimensioned pipe in direct series with the differential pressure flow meter. In one embodiment, the line pressure drop $\Delta P_f$ is measured along a length of pipe directly upstream of the differential pressure flow meter.

The apparatus may additionally comprise one or more velocity sensing elements operable to determine the velocity, u, of fluid in the flow. The velocity sensing elements may be positioned so as to measure the velocity within the within the length L along which the line pressure drop due to friction $\Delta P_f$ is measured. The velocity may be measured at a point outside the length L with the velocity within L being determined therefrom. Preferably, the velocity sensing elements are positioned such that the velocity measurement is taken at a sufficient separation from the orifice plate, such that the variation in velocity due to the differential pressure flow meter does not impact on measurement.

The velocity sensing elements may comprise ultrasonic velocity sensing elements (either clamp-on or inline), insertion probe type devices, or any other velocity sensing device fit for purpose. If located upstream of the differential pressure flow meter consideration must be given to not impacting the flow profile entering the differential pressure flow meter. The velocity sensing element itself may be the primary element. This may be the case where an intrusive flow meter is used. Examples of intrusive flow meters include but are not limited to Coriolis meters or turbine meters.

The flow property processing unit may be operable to calculate any one or more of: the Darcy-Weisbach friction factor $\lambda$, the discharge coefficient, the density $\rho$, the Reynolds number Re, the viscosity $\mu$ or the corrected volumetric flow rate Q. Such parameters and others may be calculated according to the methods outlined in the first aspect of the present invention.

In embodiments wherein the differential pressure flow meter has been calibrated before use and calibration factors have been calculated, the flow property processing unit may be operable to calculate an operational corrected value of all calculated values by the methods outlined in the first aspect of the present invention.

The apparatus may be provided with an interface. The interface may be operable to enable the output of calculated flow values. The interface may be operable to enable the output of other status information relating to the flow or the operation of the apparatus. The interface may be operable to enable the input of control signals. The interface may be operable to enable the input of calibration coefficients or other coefficients relating to the fluid or the flow.

In embodiments wherein the reference density of the fluid, $\rho_{ref}$, is known, the flow property processing unit may be operable to calculate an operational corrected value, $\rho_{cor}$, of the calculated flow density $\rho$ by the methods outlined in the first aspect of the present invention.

According to a fourth aspect of the present invention, there is provided a calibration apparatus for calibrating a differential pressure flow meter, the calibration apparatus comprising: a test pipe; a fluid supply for controllably introducing fluid into the test pipe so as to provide a flow with a desired Reynolds number; pressure sensing elements operable to measure the pressure differential across the differential pressure flow meter $\Delta P_1$; pressure sensing elements operable to measure the line pressure drop due to friction $\Delta P_f$ along a length L of pipe; and a calibration coefficient processing unit operable to calculate the quantity $$\frac{\Delta P_f}{\Delta P_1}$$

and to thereby calculate one or more calibration coefficients for the use of the differential pressure flow meter across the full Reynolds number range required.

The apparatus of the fourth aspect of the present invention may incorporate any or all features of the first, second or third aspects of the present invention as required or as desired.

The calibration coefficient processing unit operable to calculate any one of any one or more of: the Darcy-Weisbach friction factor $$\frac{\lambda_{the}}{\lambda_{calib}},$$

Reynolds number, the discharge coefficient or density $$\frac{\rho_{ref}}{\rho_{calib}}$$

according to the method of the first aspect of the present invention.

DETAILED DESCRIPTION OF THE INVENTION

In order that the invention may be more clearly understood embodiments thereof will now be described, by way of example only, with reference to the accompanying drawings, of which.

The present invention provides for the measurement of a pressure differential across a differential pressure flow meter $\Delta P_1$ and the line pressure drop due to friction $\Delta P_f$ along a length L of pipe. Subsequently, the quantity $$\frac{\Delta P_f}{\Delta P_1}$$

is calculated, enabling the inline calculation of multiple properties of the flow.

Figure 1:
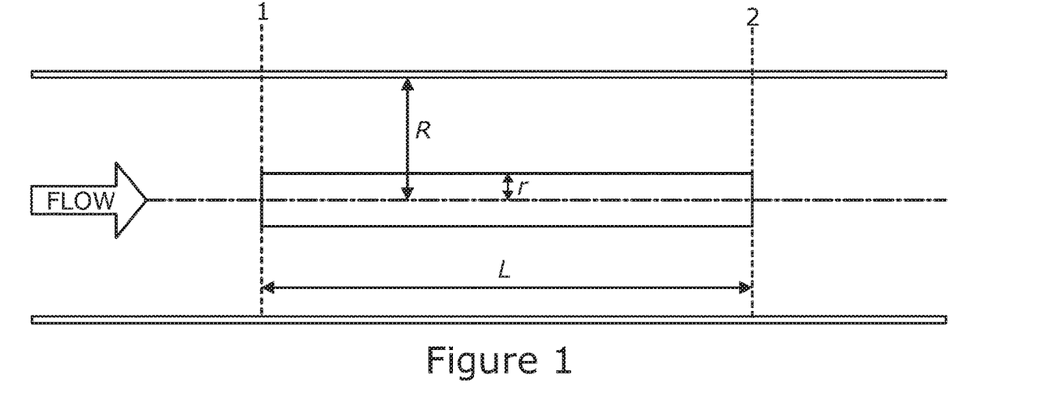
FIG. 1 illustrates fluid flow through a circular cross-section within a pipe.

Consider a fluid flowing through a circular cross section with radius, R, as shown in FIG. 1. Now consider a cylindrical element of the fluid with length, L, and radius, r, sufficiently far from the pipe wall to be outside the boundary layer. The driving force for this fluid is the differential pressure at either end of the element which must be greater than the pressure drop due to frictional forces acting on the external surface of the element.

For uniform flow, a force balance can be completed over the element as shown in equation 1.

$$(P_1 - P_2)\pi r^2 = \tau 2\pi r dL \quad (1)$$

where $P_1$ and $P_2$ are the static pressures at points 1 and 2 respectively, r is the radius of the fluid element, τ is the viscous shear stress and L is the distance between points 1 and 2. Equation 2 places $P_2$ in terms of $P_1$.

$$P_1 \pi r^2 - \left(P_1 + \frac{\delta P}{\delta L} dL\right)\pi r^2 = \tau 2\pi r dL \quad (2)$$

The viscous shear stress can be defined as shown in equation 3.

$$\tau = \mu \frac{du_x}{dr} \quad (3)$$

Where μ is the viscosity of the fluid and $u_x$ is the point velocity of the fluid which varies with r. Applying the no slip condition at the pipe wall i.e. $u_x=0$ when r=R, substituting equation 3 into equation 2, letting $$\frac{\delta P}{\delta L} = \frac{\Delta P}{L}$$

and rearranging, then the following integration can be completed (equations 4-6):

$$\int_0^{u_x} du_x = \frac{-1}{2\mu} \frac{\Delta P}{L} \int_R^r r\, dr \quad (4)$$

$$[u_x]_0^{u_x} = \frac{-1}{2\mu} \frac{\Delta P}{L} \left[\frac{1}{2} r^2\right]_R^r \quad (5)$$

$$u_x = \frac{1}{4\mu} \frac{\Delta P}{L} (R^2 - r^2) \quad (6)$$

Equation 6 is the equation for the velocity of the fluid at a certain radius, r, from the centre line.

Figure 2:
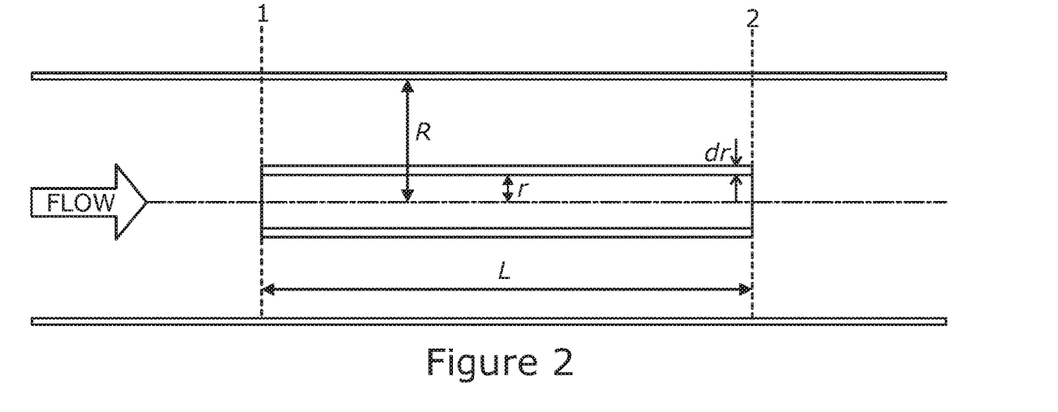
FIG. 2 illustrates fluid flow through an annular element with circular cross-section within a pipe.

Now consider an annular element of fluid within the pipe between radius r and dr for which the velocity, $u_x$, can be considered constant, as shown in FIG. 2.

The volumetric flow rate of this annular element can be written as $$dQ = u_x 2\pi r dr \quad (7)$$

The total rate of flow can therefore be found by integrating across the entire pipe radius, R. However, an equation for $u_x$ has already been found that is dependent on R. Substituting in equation 6 gives.

$$\int_0^Q dQ = \frac{\pi}{2\mu} \frac{\Delta P}{L} \int_0^R r(R^2 - r^2) dr \quad (8)$$

$$[Q]_0^Q = \frac{\pi}{2\mu} \frac{\Delta P}{L} \left[\frac{R^2 r^2}{2} - \frac{r^4}{4}\right]_0^R \quad (9)$$

$$Q = \frac{\pi}{8\mu} \frac{\Delta P}{L} R^4 \quad (10)$$

Equation 10 is called the Hagen-Poiseuille equation, developed independent by both Hagen and Poiseuille in 1839 and 1840. This equation is valid only in laminar flow. It is important as it allows us to derive the linear relationship of Darcy-Weisbach friction factor and Reynolds number for laminar flow applications.

Figure 3:
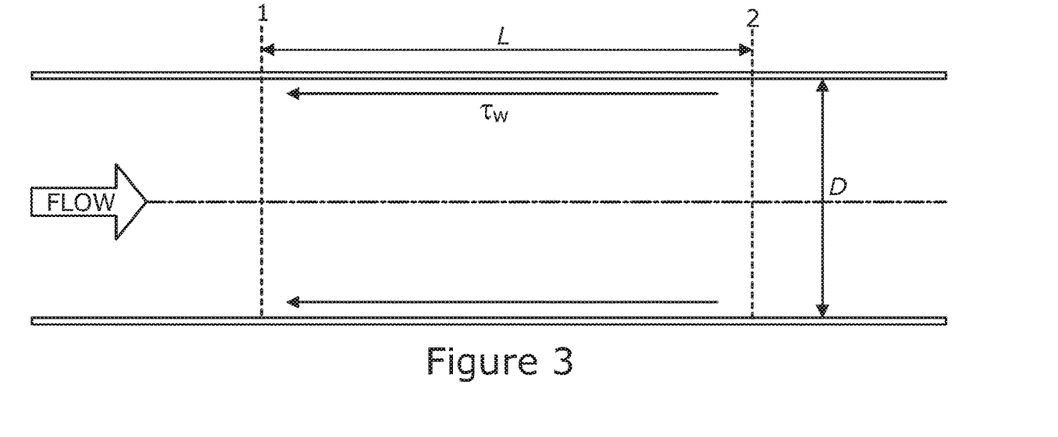
FIG. 3 illustrates flow through a pipe of circular cross-section.

Now consider a circular cross section of pipe with a pressure drop at the pipe wall caused by a wall shear stress, $\tau_w$. FIG. 3 shows this for a block of fluid with length, L, and pipe diameter, D.

Again, a force balance can be conducted over the fluid block between points 1 and 2.

$$P_1 \frac{\pi D^2}{4} - P_2 \frac{\pi D^2}{4} = \Delta P_f \frac{\pi D^2}{4} = \tau_w \pi L D \tag{11}$$

$$\Delta P_f = 4\tau_w \frac{L}{D} \tag{12}$$

The wall shear stress, $\tau_w$, is related to the kinetic energy per volume and can be written as in equation 13.

$$\tau_w = \frac{\lambda}{8}\rho u^2 \tag{13}$$

where $\lambda$ is the Darcy-Weisbach friction factor, $\rho$ the density in kg/m³ and u is the pipe velocity. Therefore, the pressure drop due to friction in the pipe can be expressed as in equation 14 and is valid for all Reynolds numbers.

$$\Delta P_f = \frac{\lambda \rho u^2 L}{2D} \tag{14}$$

By combining equation 14 and equation 10 rearranged for velocity in terms of pressure drop, an equation for friction factor in laminar flow only can be derived.

$$\frac{\lambda \rho u^2 L}{2D} = \frac{32 \mu L u}{D^2} \tag{15}$$

$$\lambda = \frac{64\mu}{\rho u D} \tag{16}$$

OR $$\lambda = \frac{64}{Re} \tag{17}$$

Equation 17 shows that in laminar flow, the friction factor is inversely proportional to Reynolds number only. This suggests that measuring friction factor in the laminar flow region will allow a direct calculation of Reynolds number. It follows that if the discharge coefficient is repeatable in laminar flow it can accurately be correlated with Reynolds number or indeed friction factor itself to provide inline corrections.

Figure 4:
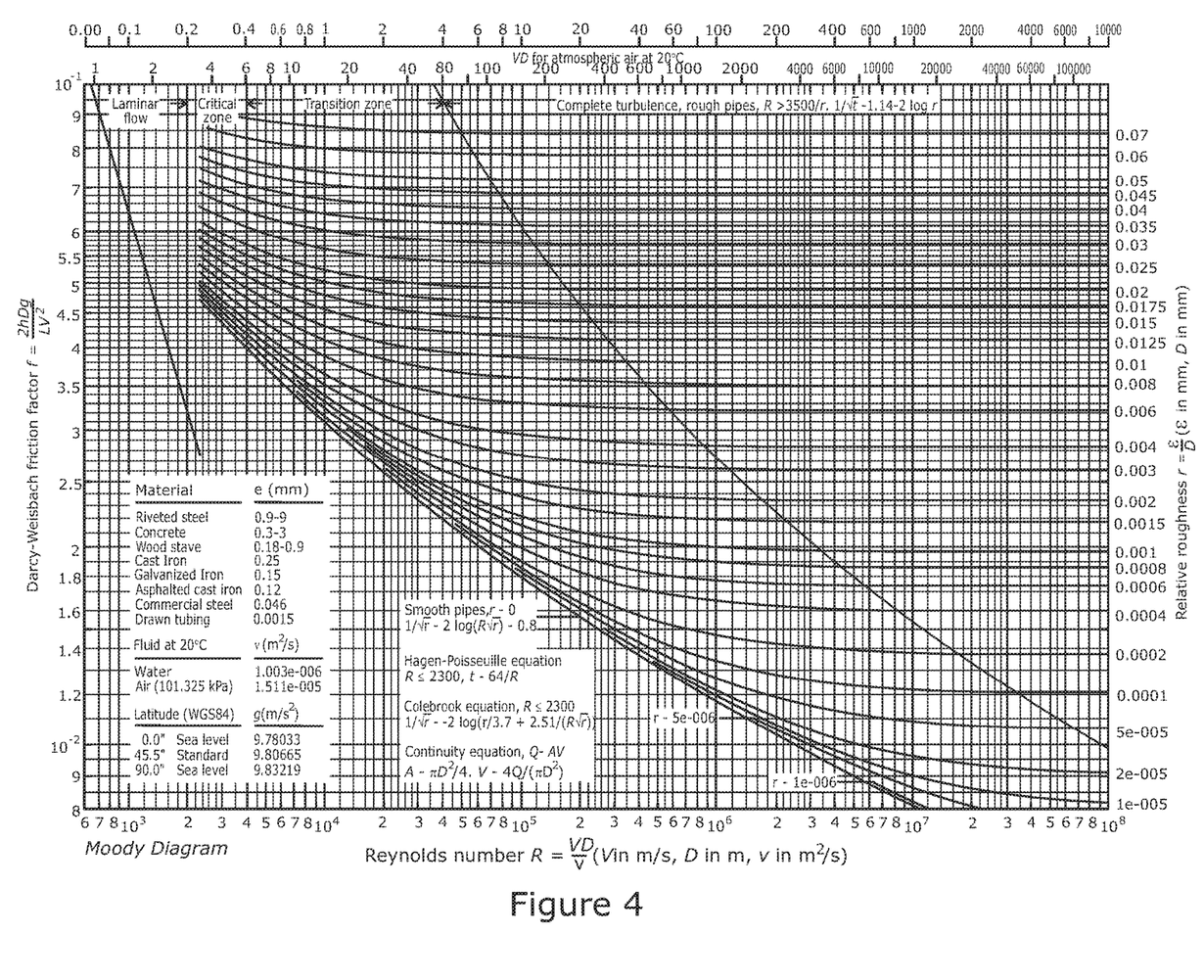
FIG. 4 is a graph illustrating the relationship between Darcy-Weisbach friction factor and Reynolds number.

It is not only laminar flow where friction factor is dependent on Reynolds number. There are several well known correlations for friction factor in turbulent flows e.g. Colebrook-White equation that would perform a similar role to equation 17. In these cases the dependence on Reynolds number is not linear but the same process can be used to calculate discharge coefficient. FIG. 4 shows the well known Moody plot of Darcy-Weisbach friction factor versus Reynolds number for a number of different relative roughness' of pipe.

Note the differences in friction factor for both laminar and turbulent flows. Also note the line of fully turbulent flow with everything on the right hand side of this line showing friction factor being independent of Reynolds number.

Figure 5:
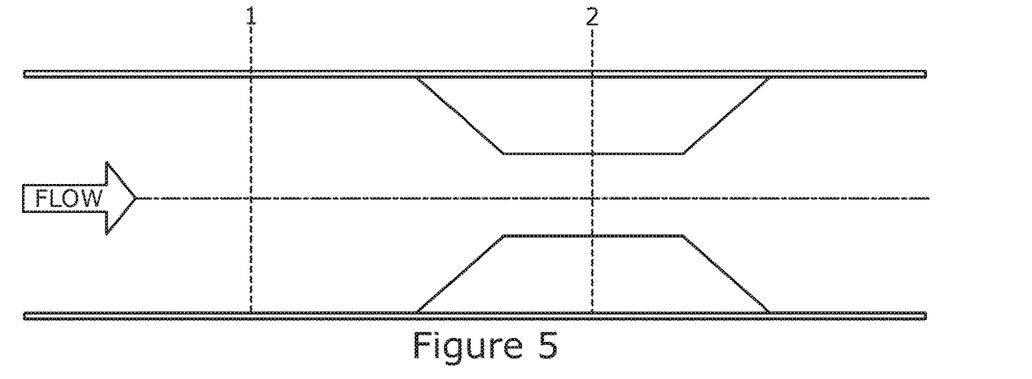
FIG. 5 illustrates fluid flow through a primary element in a circular cross-section pipe.

Friction factor is an important contributor to the invention but an understanding of differential pressure flow measurement is also required. Consider a circular cross section of pipe with a primary element which concentrically reduces the cross sectional area available for flow, as shown in FIG. 5.

Assuming inviscid and incompressible flow of the fluid and no change in elevation, from the Bernoulli equation and conservation of energy in the system, the energies at point 1 and point 2 can be written as in equation 18:

$$P_1 + \frac{1}{2}\rho u_1^2 = P_2 + \frac{1}{2}\rho u_2^2 \tag{18}$$

Where $u_1$ and $u_2$ are the velocities at point 1 and 2 respectively. From a mass balance through the system and assuming a constant fluid density, the flowrates at each point will be equal. Therefore equation 18 can be written as $$P_1 = \frac{1}{2}\rho\left(\frac{Q}{\frac{\pi D^2}{4}}\right)^4 = P_2 = \frac{1}{2}\rho\left(\frac{Q}{\frac{\pi d^2}{4}}\right)^2 \tag{19}$$

Where d is the throat diameter at point 2. Rearranging equation 19 in terms of Q gives equation 20.

$$Q = \frac{\pi d^2}{4}\sqrt{\frac{1}{\left(1-\left(\frac{d}{D}\right)^4\right)}}\sqrt{\frac{2(P_1-P_2)}{\rho}} \tag{20}$$

The ratio of the pipe diameter to the throat diameter $$\frac{d}{D}$$

is often called beta $\beta$. The inclusion a parameter known as the Discharge Coefficient $C_d$ helps remove errors associated with assumptions and location of pressure measurements. Finally, a term to correct for the expansibility of the fluid $\varepsilon$ is included with $\varepsilon$ equal to 1 for incompressible fluids.

The final equation for the calculation of volume flow through a primary element (similar to a Venturi or orifice plate) is therefore $$Q = C_d \varepsilon \frac{\pi d^2}{4}\sqrt{\frac{1}{(1-\beta^4)}}\sqrt{\frac{2(P_1-P_2)}{\rho}} \tag{21}$$

OR $$Q = C_d \varepsilon \frac{\frac{\pi d^2}{4}}{\sqrt{(1-\beta^4)}}\sqrt{\frac{2(\Delta P_1)}{\rho}} \tag{22}$$

The invention is derived from creating a measurement system that combines the differential pressure flow rate equation (equation 22) with the Darcy-Weisbach friction factor equation (equation 14). Combining these two principles creates a powerful tool providing more information than either singularly.

Figure 6:
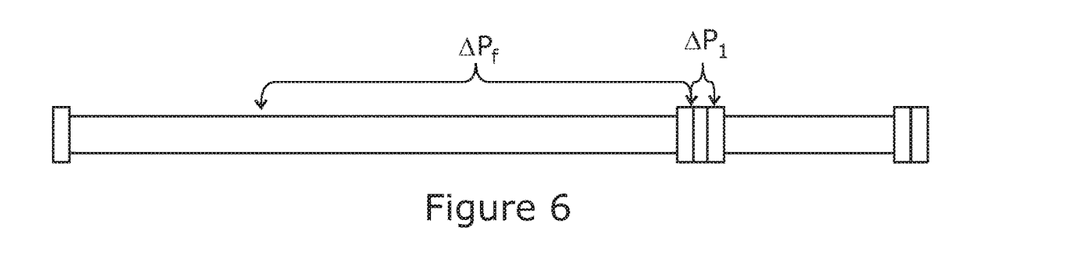
FIG. 6 illustrates schematically an embodiment of an apparatus for monitoring flow according to the present invention.

Turning now to FIG. 6, a differential pressure meter is provided within a metering run and is operable to measure a pressure drop, $\Delta P_1$, across the differential pressure meter. Additionally, the pressure drop, $\Delta P_f$, due to friction across a straight length of pipe is measured. In FIG. 5, an orifice plate is shown but in practice, the differential pressure primary element can be any obstruction or expansion that generates a repeatable, reproducible and measurable pressure differential. Utilising these two measurements can facilitate the calculation of various fluid properties as is explained further below.

$$\Delta P_f = \frac{\lambda \rho u^2 L}{2D} \qquad (14)$$

In equation 14 (reproduced above), a velocity measurement, amongst others, is required in order to calculate the friction factor. The velocity can be calculated from the volumetric flow through the differential pressure flow meter by equation 23.

$$u = \frac{Q}{\frac{\pi D^2}{4}} \qquad (23)$$

where Q is the volumetric flow rate. Replacing the volumetric flow rate term in equation 23 with the theoretical equation for flow measurement using a differential pressure device (equation 22) yields equation 24 (removing $\varepsilon=1$).

$$Q = C_d \varepsilon \frac{\frac{\pi d^2}{4}}{\sqrt{(1-\beta^4)}} \sqrt{\frac{2(\Delta P_1)}{\rho}} \qquad (22)$$

$$u^2 = \frac{2C_d^2 \beta^4 \Delta P_1}{\rho(1-\beta^4)} \qquad (24)$$

Where d is the internal diameter of the throat of the orifice, $\beta$ is the ratio of the throat diameter to pipe diameter and $\Delta P_1$ is the pressure drop due to the throat restriction.

Now, substituting Equation 24 back into Equation 14 removes the density term leaving an equation for friction factor that is independent of the physical properties of the fluid being measured. Equation 25 shows two terms; one a ratio of two differential pressure measurements and two a constant relating to meter geometry, pipe length and discharge coefficient.

$$\lambda = \frac{\Delta P_f}{\Delta P_1} C_M \qquad (25)$$

Where, $$C_M = \frac{D(1-\beta^4)}{C_d^2 L \beta^4} \qquad (26)$$

By measuring the pressure drop $\Delta P_1$ across the differential pressure meter and the pressure drop $\Delta P_f$ along a length of pipe, and with knowledge of the pipe and meter geometry, it is possible to calculate friction factor in line using equations 25 and 26. This can translate to a more accurate Reynolds number from equation 17 for laminar flow and any well known correlation such as Colebrook-White for turbulent flow.

Equation 25 should deliver a repeatable correlation for friction factor. This correlation is independent of physical properties of the fluid.

Applying the described calculation method in practice can be accomplished by two real-time differential pressure measurements only. These measurements will be made subject to standard practices in terms of ensuring a sufficiently low uncertainty in their measurements and regular calibrations and maintenance as described in many operating procedures and good practice documents.

Knowledge is also required of the geometry of pipe work and primary element as well as an indication of the systems performance i.e. discharge coefficient over the useable Reynolds number range and hence friction factor range. This can be accomplished by a calibration and characterisation of the measurement system or by some other method. Each method will have a different level of accuracy and uncertainty. Accordingly, the skilled man will aim to select a calibration and characterisation method that will deliver optimal results in the particular circumstances. Typically, characterisation and calibration will allow the establishment of an equation or similar to relate discharge coefficient as a function of friction factor (equation 27) or to relate discharge coefficient as a function of Reynolds number (equation 28).

$$C_d = f(\lambda) \qquad (27)$$

$$C_d = f(Re) \qquad (28)$$

Using the established relation and equation 25 it is possible to determine the friction factor, Reynolds number and discharge coefficient for the measurement system. This can be achieved using an iterative approach. Alternatively, it may be beneficial to compare this calculated friction factor or Reynolds number value with the theoretical or reference value. A simple ratio of the calculated to reference values allows for the calculation of a corrected friction factor and corrected Reynolds number as shown in equations 29 and 30 respectively. $\lambda_{cor}, \lambda_{the}$ This in turn aligns the measured values with theory.

$$\lambda_{cor} = \frac{\lambda_{the}}{\lambda_{calib}} \lambda_{calc} \qquad (29)$$

$$Re_{cor} = \frac{Re_{ref}}{Re_{calib}} Re_{calc} \qquad (30)$$

Where $\lambda_{calib}$ is the calculated friction factor value during calibration, $\lambda_{calc}$ is calculated friction factor during operation, $\lambda_{the}$ is the theoretical friction factor for the reference Reynolds number, $Re_{calib}$ is the calculated Reynolds number during calibration, $Re_{calc}$ is the calculated Reynolds number during calibration and $Re_{ref}$ is the reference Reynolds number during calibration.

Using the friction factor method, the correct discharge coefficient can be calculated independently of the physical properties of the fluid. Equation 22 can now be used to calculate the corrected volumetric flow rate of the fluid (Note: Density of the fluid would still be required to complete the calculation. This can be obtained from standard sources e.g. fluid sampling).

Figure 7:
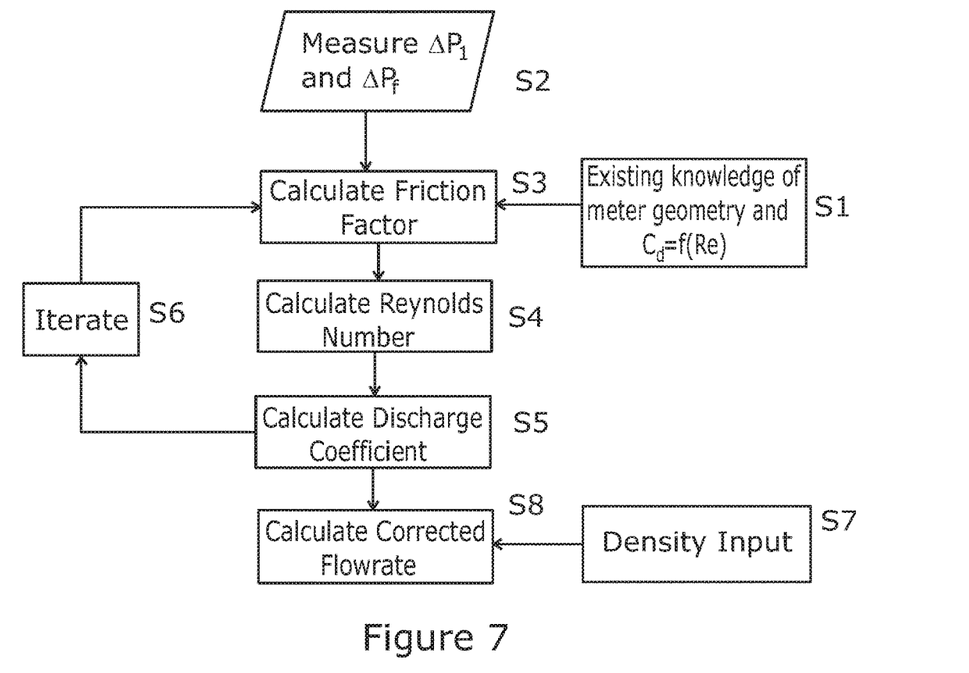
FIG. 7 is a flow chart illustrating an implementation of a method of flow monitoring with external density knowledge according to the present invention.

Turning now to FIG. 7, the process steps in determining flow properties in accordance with an implementation of the method of the present invention are set out in a schematic flow chart. At the initial step, S1, a relation (equation 27 or 28) is established (or looked up) between the discharge coefficient and the Reynolds number. Subsequently, at S2, the pressure differential, $\Delta P_1$, across the differential pressure meter and the pressure drop $\Delta P_f$ along a length of pipe are measured. At S3, the Darcy-Weisbach friction factor can be calculated using equation 25. In some implementations, this can involve calculating a corrected value of the friction factor as set out in equation 29. At S4, the friction factor is used to calculate a value for the Reynolds number of the flow, for instance using equation 17 or Colebrook-White equation. In some implementations, this can involve calculating a corrected value of the Reynolds number as set out in equation 30.

At S5, the discharge coefficient can be calculated using the calculated or corrected value of the Reynolds number. In some embodiments, the value of the discharge coefficient calculated at S5 may be iterated back to the calculation of the friction factor at S3 through the iteration process at S6.

At S7, the density of the fluid is established by sampling, looking up or other appropriate method. Subsequently at S8, the established density value is used to calculate a flowrate of the fluid using equation 21 or 22 as appropriate.

In further implementations of the invention, it is possible to use knowledge of the friction factor and discharge coefficient to infer the density of the fluid in real-time. From equation 14, the unknowns are density and velocity of the fluid. Rearranging in terms of density gives equation 31.

$$\rho = \frac{2\Delta P_f D}{\lambda L u^2} \quad (31)$$

The velocity can be measured using a suitable measurement device such as a clamp-on ultrasonic meter or the like. The measured velocity may then be used to calculate the density using equation 31.

In another implementation, it is not necessary to measure the velocity. Instead, combining equation 14 and 22, there are two equations with two unknowns. It is possible to iterate these two values to provide a density and a corrected volumetric flowrate. This may be applicable where indications of a target density are known e.g. in water applications where the physical properties are relatively well known.

As with friction factor, correction of the density can be made on initial meter calibration by using equation 32.

$$\rho_{cor} = \frac{\rho_{ref}}{\rho_{calib}} \rho_{calc} \quad (32)$$

where $\rho_{cor}$ is the corrected density, $\rho_{ref}$ is the reference density during calibration, $\rho_{calib}$ is the calculated density during calibration and $\rho_{calc}$ is the calculated density during operation.

When the density is known, it is further possible to calculate the viscosity of the fluid, $\mu$. Knowledge of the density, pipe diameter, velocity and Reynolds number (derived from friction factor) allows viscosity to be calculated using the standard Reynolds number, Re, calculation equation as shown in equation 33.

$$\mu = \frac{\rho D u}{Re} \quad (33)$$

Figure 8:
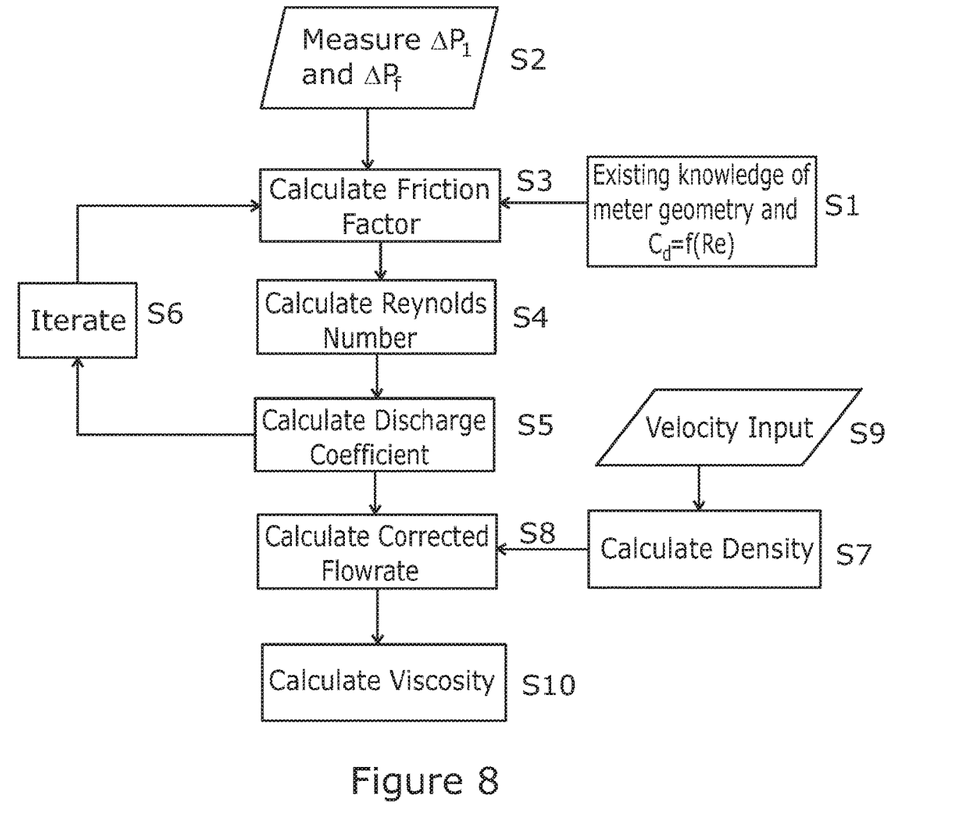
FIG. 8 is a flow chart illustrating another implementation of a method of flow monitoring involving calculation of all parameters according to the present invention.

Turning now to FIG. 8, a flow chart illustrating the additional steps in implementations involving the calculation of flow properties using the above techniques is shown. For ease of understanding, steps in FIG. 8 are given reference numerals corresponding to like steps in FIG. 7.

In FIG. 8, S1-S6 and S8 are identical to those in FIG. 7. S7 differs in that the density is calculated either from a velocity measurement using equation 31 or from knowledge of a target density. In some embodiments, the value of the flowrate calculated at S8 may be iterated back to the calculation of the density at S7.

At S10, the viscosity is calculated using equation 33. This calculation can use a measured velocity or the velocity equivalent of the flowrate calculated at S8. Typically, the calculation would also use the Reynolds number calculated at S4 and density value at S7.

Figure 9:
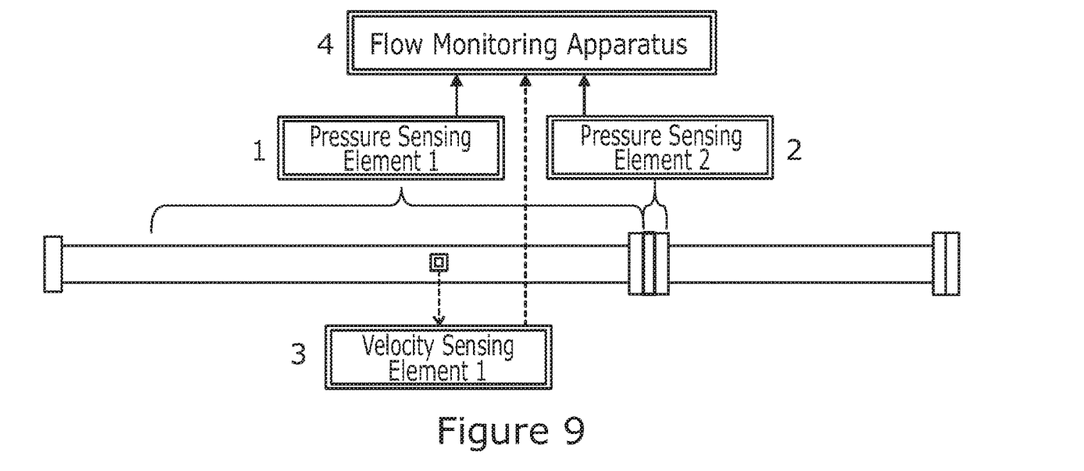
FIG. 9 illustrates schematically another embodiment of an apparatus for monitoring flow according to the present invention.

In order to implement the above methods, a flow monitoring apparatus according to FIG. 9 can be utilised with the pipe and orifice plate of FIG. 6. As shown in FIG. 9, a pair of sensing elements 1, 2 are operable to detect the differential pressure $\Delta P_f$ along the upstream length of pipe and the pressure drop $\Delta P_1$ across the orifice plate flow meter. In preferred implementations, the sensing elements are direct differential pressure sensors and transmitters but other methods to deliver or infer the differential pressure of these locations could be accommodated. For implementations where velocity is measured, a velocity sensing element 3 is provided. The output of each sensing element 1, 2, 3 is fed to a flow property processing unit 4 operable to calculate the quantity $$\frac{\Delta P_f}{\Delta P_1}$$

and to thereby calculate one or more flow properties as set out above.

Before installing an orifice plate flow meter as part of an apparatus above or implement the above methods on such an arrangement, the flow meter may be calibrated. This can be achieved by installing the flow meter in a suitable test pipe line equipped with suitable sensing elements and a suitable supply of fluid for simulating flow with Reynolds numbers across the desired range of use. The differential pressure ratio $$\frac{\Delta P_f}{\Delta P_1}$$

can then be calculated across the desired range of Reynolds numbers. Subsequently, this can be used to calculate all the above mentioned flow parameters including the calibration parameters $\lambda_{calib}$, $Re_{calib}$ and $\rho_{calib}$.

Subsequently, it is possible to determine suitable corrections such as $\lambda_{cor}$ and $\rho_{cor}$ as described above to compensate for variations in the pipe set up used in operation.

In summary, from knowledge of meter and pipe geometry and previous knowledge of discharge coefficient as a function of friction factor or Reynolds number, it is possible to calculate a wealth of information about flowing fluid from two differential pressure measurements and an indicative pipe velocity only. The information that can be provided includes:

Friction factor
Reynolds number
Discharge coefficient
Density
Viscosity
Corrected flowrate The above embodiments are described by way of example only. Many variations are possible without departing from the scope of the invention as defined in the appended claims.

The invention claimed is:

1. A method of monitoring fluid flow, the method comprising the steps of:
measuring a pressure differential across a differential pressure flow meter $\Delta P_1$;
measuring the line pressure drop due to friction $\Delta P_f$ along a length L of pipe; and
calculating the quantity $$\frac{\Delta P_f}{\Delta P_1},$$

calculating the Darcy-Weisbach friction factor, $\lambda$, from the product of the quantity $$\frac{\Delta P_f}{\Delta P_1}$$

and a quantity related to meter geometry $C_M$; and thereby calculating one or more properties of the flow.

2. A method as claimed in claim 1 wherein the method is most effective when used in laminar flow conditions or in the low Reynolds number region of turbulent flow.

3. A method as claimed in claim 1 wherein the method includes the step of determining an operational corrected value, $\lambda_{cor}$, of the calculated Darcy-Weisbach friction factor $\lambda$.

4. A method as claimed in claim 3 wherein knowledge of the relationship between discharge coefficient and friction factor is obtained from a calibration of the measurement system.

5. A method as claimed in claim 1 wherein the method includes the steps of calculating the discharge coefficient of the flow.

6. A method as claimed in claim 5 wherein the method includes calculating the discharge coefficient of the flow and friction factor by means of iteration using the relationship between discharge coefficient and friction factor and the relationship between friction factor and the quantity $$\frac{\Delta P_f}{\Delta P_1}.$$

7. A method as claimed in claim 1 wherein the method includes the additional step of calculating the Reynolds number Re of the flow.

8. A method as claimed in claim 7 wherein the method includes the additional step of calculating an operational corrected value, $Re_{cor}$, of the calculated Reynolds number Re.

9. A method as claimed in claim 7 wherein the method includes the step of calculating the discharge coefficient from the Reynolds number, where the Reynolds number is determined from the calculated Darcy-Weisbach friction factor $\lambda$.

10. A method as claimed in claim 1 wherein the method includes the further step of calculation of the flow rate.

11. A method as claimed in claim 1 wherein the method includes the steps of calculating the density, $\rho$, of the flow.

12. A method as claimed in claim 11 wherein the method includes the step of determining an operational corrected value, $\rho_{cor}$, of the calculated flow density $\rho$.

13. A method as claimed in claim 11 wherein the method includes the steps of calculating the viscosity, $\mu$, of the fluid.

14. A method as claimed in claim 1 wherein the method involves the additional step of determining the velocity of the fluid in the pipe.

15. A method as claimed in claim 14 wherein the velocity is measured within the length L along which the line pressure drop due to friction $\Delta P_f$ is measured.

16. A method as claimed in claim 14 wherein the density is calculated from the measured velocity.

17. A method as claimed in claim 1 wherein the method is used to calibrate a differential pressure flow meter.

18. A method as claimed in claim 17 wherein the method includes the additional step of installing the differential pressure flow meter in a test pipe.

19. A method as claimed in claim 17 wherein the method includes measuring across the full Reynolds number range required $\Delta P_1$ and $\Delta P_f$, calculating across the full Reynolds number range required the quantity $$\frac{\Delta P_f}{\Delta P_1}$$

and thereby calculating calibration coefficients for the use of the differential pressure flow meter.

20. A method of calibration of a differential pressure flow meter for monitoring fluid flow comprising the steps of: installing the differential pressure flow meter in a test pipe; measuring across the full Reynolds number range required: a pressure differential across the differential pressure flow meter $\Delta P_1$; and the line pressure drop due to friction $\Delta P_f$ along a length L of pipe; calculating across the full Reynolds number range required the quantity $$\frac{\Delta P_f}{\Delta P_1};$$

calculating the Darcy-Weisbach friction factor, $\lambda$, from the product of the quantity $$\frac{\Delta P_f}{\Delta P_1},$$

and a quantity related to meter geometry $C_M$; and thereby calculating calibration coefficients for the use of the differential pressure flow meter.

21. A method as claimed in claim 20 wherein the further steps of: installing the differential pressure flow meter in an operation setting; measuring in operation a pressure differential across a differential pressure flow meter $\Delta P_1$; and the line pressure drop due to friction $\Delta P_f$ along a length L of pipe; calculating the quantity $$\frac{\Delta P_f}{\Delta P_1};$$

and thereby calculating live values of correction parameters.

22. An apparatus for monitoring fluid flow, the apparatus comprising:
a differential pressure flow meter; pressure sensing elements operable to measure a pressure differential across a flow meter $\Delta P_1$; pressure sensing elements operable to measure the line pressure drop due to friction $\Delta P_f$ along a length L of pipe; and a flow property processing unit operable to calculate the quantity $$\frac{\Delta P_f}{\Delta P_1}$$

and to calculate the Darcy-Weisbach friction factor, $\lambda$, from the product of the quantity $$\frac{\Delta P_f}{\Delta P_1}$$

and a quantity related to meter geometry $C_M$; and to thereby calculate one or more flow properties.

23. An apparatus as claimed in claim 22 wherein the differential pressure flow meter comprises any of orifice plate, Venturi meter, Dall tube, Pitot tube, multi-hole pressure probe, cone meter, wedge meter, Coriolis meter, turbine meter, reduced bore ultrasonic meter, valve or process equipment.

24. An apparatus as claimed in claim 22 wherein the apparatus additionally comprises one or more velocity sensing elements operable to determine the velocity of fluid in the flow.

25. An apparatus as claimed in claim 24 wherein the velocity sensing elements are positioned so as to measure the velocity within the length L along which the line pressure drop due to friction $\Delta P_f$ is measured.

26. An apparatus as claimed in claim 24 wherein the velocity sensing elements comprise ultrasonic velocity sensing elements.

27. An apparatus as claimed in claim 22 wherein the flow property processing unit is operable to calculate any one or more of: the discharge coefficient, the density $\rho$, the Reynolds number Re, the viscosity $\mu$ or the corrected volumetric flow rate Q.

28. An apparatus as claimed in claim 27 wherein the flow property processing unit may be operable to calculate an operational corrected value, $\lambda_{cor}$, of the calculated Darcy-Weisbach friction factor $\lambda$.

29. An apparatus as claimed in claim 27 wherein the flow property processing unit is operable to calculate an operational corrected value, $\rho_{cor}$, of the calculated flow density $\rho$.

30. An apparatus as claimed in claim 22 wherein the apparatus is provided with an interface operable to enable the output of calculated flow values or other status information relating to the flow or the operation of the apparatus.

31. An apparatus as claimed in claim 30 wherein the interface is operable to enable the input of control signals or to enable the input of calibration coefficients or other coefficients relating to the fluid or the flow.

32. A calibration apparatus for calibrating a differential pressure flow meter, the calibration apparatus comprising: a test pipe; a fluid supply for controllably introducing fluid into the test pipe so as to provide a flow with a desired Reynolds number; pressure sensing elements operable to measure the pressure differential across the differential pressure flow meter $\Delta P_1$; pressure sensing elements operable to measure the line pressure drop due to friction $\Delta P_f$ along a length L of pipe; and a calibration coefficient processing unit operable to calculate the quantity $$\frac{\Delta P_f}{\Delta P_1}$$

and to calculate the Darcy-Weisbach friction factor, $\lambda$, from the product of the quantity $$\frac{\Delta P_f}{\Delta P_1}$$

and a quantity related to meter geometry $C_M$; and to thereby calculate one or more calibration coefficients for the use of the differential pressure flow meter across the full Reynolds number range required.

* * * * *